(12) United States Patent
Min

(10) Patent No.: US 9,052,787 B2
(45) Date of Patent: Jun. 9, 2015

(54) METHOD OF MANUFACTURING TOUCH SENSING APPARATUS

(75) Inventor: Dong Jin Min, Goyang-si (KR)

(73) Assignee: Melfas Inc., Seoul (KR)

(*) Notice: Subject to any disclaimer, the term of this patent is extended or adjusted under 35 U.S.C. 154(b) by 359 days.

(21) Appl. No.: 13/596,177

(22) Filed: Aug. 28, 2012

(65) Prior Publication Data
US 2013/0169558 A1 Jul. 4, 2013

(30) Foreign Application Priority Data
Dec. 30, 2011 (KR) .................. 10-2011-0147504

(51) Int. Cl.
*H01S 4/00* (2006.01)
*G06F 3/044* (2006.01)

(52) U.S. Cl.
CPC .......... *G06F 3/044* (2013.01); *Y10T 29/49105* (2015.01); *G06F 2203/04103* (2013.01)

(58) Field of Classification Search
CPC .......... G06F 3/044; G06F 2203/04103; Y10T 29/49105
USPC ................. 29/592.1, 830, 840, 852; 438/107
See application file for complete search history.

(56) References Cited

U.S. PATENT DOCUMENTS

| | | | |
|---|---|---|---|
| 6,440,773 B1 * | 8/2002 | Usami ........................... | 438/107 |
| 7,860,357 B2 * | 12/2010 | Lee et al. ........................ | 385/14 |
| 8,338,936 B2 * | 12/2012 | Pressel et al. .................. | 257/691 |
| 2010/0019370 A1 * | 1/2010 | Pressel et al. .................. | 257/690 |
| 2012/0319304 A1 * | 12/2012 | Pressel et al. .................. | 257/787 |

* cited by examiner

*Primary Examiner* — Carl Arbes
(74) *Attorney, Agent, or Firm* — Fenwick & West LLP

(57) ABSTRACT

A method for manufacturing a touch sensing apparatus includes repeatedly forming a plurality of electrode patterns on a first sub-substrate unwound from a first roller; repeatedly forming a plurality of interconnection patterns on a second sub-substrate unwound by a second roller; forming an array of touch sensing substrates by adhering the first sub-substrate to the second sub-substrate; forming a plurality of via holes through which the plurality of electrode patterns are electrically connected to the plurality of interconnection patterns; and cutting the array of touch sensing substrates into a plurality of touch sensing substrates, each touch sensing substrate including one of the electrode patterns and one of the interconnection patterns.

15 Claims, 19 Drawing Sheets

METHOD OF MANUFACTURING TOUCH SENSING APPARATUS

CROSS-REFERENCE TO RELATED APPLICATIONS

This application claims the benefit of Korean Patent Application No. 10-2011-0147504, filed on Dec. 30, 2011, which is hereby incorporated by reference for all purposes as if fully set forth herein.

BACKGROUND OF THE INVENTION

1. Field of the Invention

The present invention relates to a touch sensing apparatus and a method for manufacturing the same, and more particularly, to a method for manufacturing a touch sensing apparatus using a roll-to-roll process.

2. Discussion of the Related Art

In general, a touch sensing apparatus includes a touch panel and senses a user's touch or gesture as input information. Touch panels are classified into resistive type, capacitive type, ultrasonic type and infrared type. Specifically, the capacitive type touch panels are drawing much attention due to their capability of sensing multi-touch inputs.

In the capacitive type touch panels, it is important to configure the touch panels so as to accurately sense a change in the capacitance. A capacitive type touch panel may have double-layered touch sensors. Such a capacitive type touch panel may be implemented with an array of pixels formed by a plurality of drive electrode traces (e.g., traces extending in the Y-axis direction) intersecting a plurality of sense electrode traces (e.g., traces extending in the X-axis direction). The drive and sense electrode traces are separated by a dielectric material such as polyethylene terephthalate (PET) or glass. However, the double-layered touch panel has some drawbacks such as high manufacturing costs and an increased thickness.

To address these disadvantages, a touch panel having single-layered touch sensors has been proposed in which the drive and sense electrode traces are formed on a single surface of a substrate. For example, Korean Patent Application No. 10-2007-0021332 filed on Mar. 7, 2007 and entitled "Contact position sensing panel having a simplified stacked structure," which is incorporated by reference herein, describes a touch panel having single-layered touch sensors.

In the touch panel having single-layered touch sensors, an insulation layer is formed on the substrate, a flexible printed circuit board (FPCB) is stacked on the insulation layer, and the FPCB and the touch sensors are electrically connected to each other through via holes formed in the insulation layer, thereby implementing external wirings. Alternatively, external wirings may be implemented by attaching the wiring portions of the touch sensors to the FPCB using an anisotropic conductive layer.

However, because processes for implementing the above-described structure are separately performed on each touch panel, there is a limitation in continuously performing the processes. In addition, cracks may be created at an adhering part between the FPCB and the insulation layer due to changes in humidity and temperature.

SUMMARY OF THE INVENTION

Accordingly, the present invention is directed to a touch sensing apparatus and a method of manufacturing the same that substantially obviates one or more of the problems due to limitations and disadvantages of the related art.

An advantage of the present invention is to provide a touch sensing apparatus that can be manufactured with reduced costs and tact time, and a method for manufacturing the touch sensing apparatus.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a method for manufacturing a touch sensing apparatus may include repeatedly forming a plurality of electrode patterns on a first sub-substrate unwound from a first roller; repeatedly forming a plurality of interconnection patterns on a second sub-substrate unwound by a second roller; forming an array of touch sensing substrates by adhering the first sub-substrate to the second sub-substrate; forming a plurality of via holes through which the plurality of electrode patterns are electrically connected to the plurality of interconnection patterns; and cutting the array of touch sensing substrates into a plurality of touch sensing substrates, each touch sensing substrate including one of the electrode patterns and one of the interconnection patterns.

In another aspect of the present invention, a touch sensing apparatus having a touch sensing substrate may include a plurality of electrode patterns and a plurality of connection patterns on a surface of a first sub-substrate, the connection patterns electrically connected to the electrode patterns; and a plurality of interconnection patterns on a surface of a second sub-substrate disposed on another surface of the first sub-substrate, wherein the connection patterns and the interconnection patterns are electrically connected through via holes.

In yet another aspect of the present invention, a touch sensing apparatus may include a first sub-substrate including electrode patterns disposed on its one surface, connection patterns electrically connected to the electrode patterns and a capping pattern connected to the connection patterns; a second sub-substrate including interconnection patterns disposed on its one surface; an optical clear adhesive (OCA) layer disposed on the first sub-substrate; a transparent window disposed on the OCA layer; and an adhesive layer disposed between the first sub-substrate and the second sub-substrate, wherein the other surface of the first sub-substrate and the other surface of the second sub-substrate face each other, the first sub-substrate includes a touch sensing region and a peripheral region surrounding the touch sensing region, the electrode patterns are disposed in the touch sensing region, at least portions of the connection patterns are disposed in the peripheral region, the via hole is disposed in the peripheral region to overlap the capping pattern, and the second sub-substrate does not overlap the touch sensing region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to exemplary embodiments of the present invention, examples of which are illustrated in the accompanying drawings.

Figure 1:
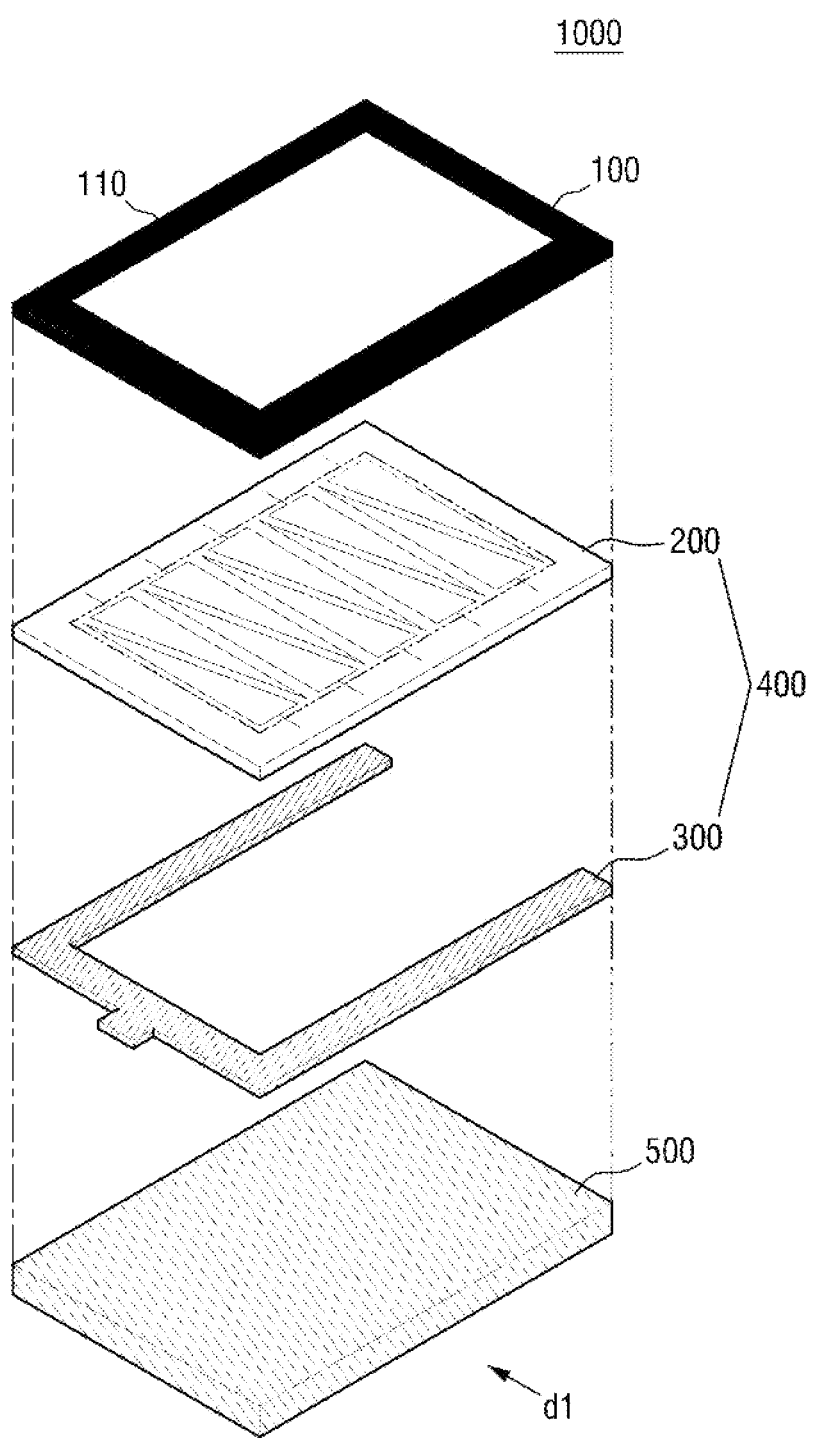
FIG. 1 is an exploded perspective view of a touch sensing apparatus according to an embodiment of the present invention.
Figure 2:
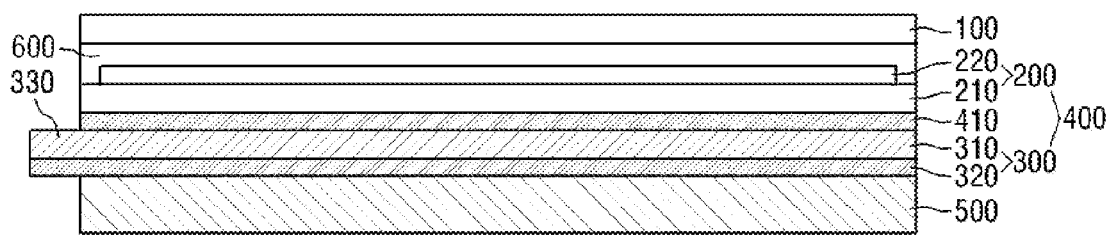
FIG. 2 is a side view of the touch sensing apparatus from direction dl shown in FIG. 1.

FIG. 1 is an exploded perspective view of a touch sensing apparatus according to an embodiment of the present invention, and FIG. 2 is a side view of the touch sensing apparatus from direction dl shown in FIG. 1.

Referring to FIGS. 1 and 2, the touch sensing apparatus 1000 may include a transparent window 100, a touch sensing substrate 400 and a display panel 500. The transparent window 100 is disposed on a surface of the touch sensing substrate 400. The transparent window 100 may be made of a high-strength material such as reinforced glass or acryl resin, or a hard material to be applied to a flexible display, such as polyethylene terephthalate (PET), polycarbonate (PC), polyethersulfone (PES), polyimide (PI), polymethly methacrylate (PMMA), or the like. The transparent window 100 maintains the external shape of an input unit of the touch sensing apparatus 1000, accepts touches of a conductive object such as a user's finger or a stylus pen, and protects the touch sensing apparatus 1000 from external impacts.

A bezel 110 may be formed at an edge of the transparent window 100. The bezel 110 may prevent wirings including interconnection patterns on the touch sensing substrate 400 from being exposed to the outside. According to some embodiments of the present invention, the bezel 110 may prevent a second sub-substrate 300 of the touch sensing substrate 400 from being exposed to the outside.

The touch sensing substrate 400 is disposed on a surface of the transparent window 100. The touch sensing substrate 400 may include a first sub-substrate 200, a second sub-substrate 300 and an adhesive layer 410. On the first sub-substrate 200 are electrode patterns that sense touch inputs and generate touch sensing signals, and connection patterns that are connected to the electrode patterns and transmit the touch sensing signals from the electrode patterns. On the second sub-substrate 300 are interconnection patterns that are electrically connected to the connection patterns and transmit the touch sensing signals to an external circuit.

According to some embodiments of the present invention, the relative positions of the first sub-substrate 200 and the second sub-substrate 300 in the touch sensing substrate 400 may be switched. That is to say, the second sub-substrate 300 may be located between the transparent window 100 and the first sub-substrate 200.

The first sub-substrate 200 includes a first base 210 and a first conductive pattern 220. The first base 210 may be made of a transparent material, and examples thereof may include polyethylene terephthalate (PET), polycarbonate (PC), polyethersulfone (PES), polyimide (PI), polymethly methacrylate (PMMA), or the like. According to some embodiments of the present invention, the first base 210 may be made of a flexible material that can be wound around a roller. The first conductive pattern 220 is disposed on a surface of the first base 210. The first conductive pattern 220 may be made of a transparent conductive material, and examples thereof may include indium tin oxide (ITO), metal mesh, silver nanowire, carbon nanotube (CNT), or the like. The first conductive pattern 220 may include electrode patterns and connection patterns, which are formed by patterning the transparent conductive material. Although the first conductive pattern 220 is formed as a flat layer in FIG. 2, it may be formed in various shapes depending on the shapes of the electrode patterns and the connection patterns. In addition, the first conductive pattern 220 may include a plurality of patterns spaced apart from each other.

The second sub-substrate 300 includes a second base 310 and a second conductive pattern 320. The second base 310 may be made of PET, PC, PES, PI, PMMA, or the like. According to some embodiments of the present invention, the second sub-substrate 300 may be made of a flexible material that can be wound around a roller. According to some embodiments of the present invention, the second sub-substrate 300, which can be made of a transparent material, may not be exposed to the outside of the touch sensing apparatus because of the bezel 110 of the transparent window 100. The second conductive pattern 320 may include interconnection patterns made of a conductive material, such as copper. Although the second conductive pattern 320 is formed as a flat layer in FIG. 2, it may be formed in various shapes depending on the shapes of the interconnection patterns.

The first sub-substrate 200 and the second sub-substrate 300 may be disposed such that the opposite surface to the surface of the first sub-substrate 200 having the first conductive pattern 220 disposed thereon and the opposite surface to the surface of the second sub-substrate 300 having the second conductive pattern 320 disposed thereon face each other.

The adhesive layer 410 between the first sub-substrate 200 and the second sub-substrate 300 is used to attach the first sub-substrate 200 and the second sub-substrate 300. The adhesive layer 410 may include a variety of types of adhesive material such as an adper prompt (AP) adhesive, an acryl adhesive or a film type adhesive. The touch sensing substrate 400 will be described below in more detail with reference to FIGS. 3 to 6.

The display panel 500 may be disposed under the touch sensing substrate 400. According to some embodiments of the present invention, the display panel 500 may be disposed on the surface of the touch sensing substrate 400 on which the second conductive pattern 320 is disposed. The display panel 500 may display images. For example, the display panel 500 may be a liquid crystal display (LCD) panel, an electrophoretic display panel, an organic light emitting diode (OLED) panel, a light emitting diode (LED) panel, an organic electroluminescent (EL) display panel, a field emission display (FED) panel, a surface-conduction electron-emitter display (SED) panel, a plasma display panel (PDP) or a cathode ray tube (CRT) display panel. Although not shown, the touch sensing apparatus 1000 may further include a display panel controller for supplying signals to display images on the display panel 500. According to some embodiments of the present invention, the touch sensing apparatus 1000 may be incorporated into various types of electronic devices, such as a mobile phone, a portable multimedia player (PMP), an MP3 player, or other electronic devices capable of receiving signals through external manipulation.

Figure 3:
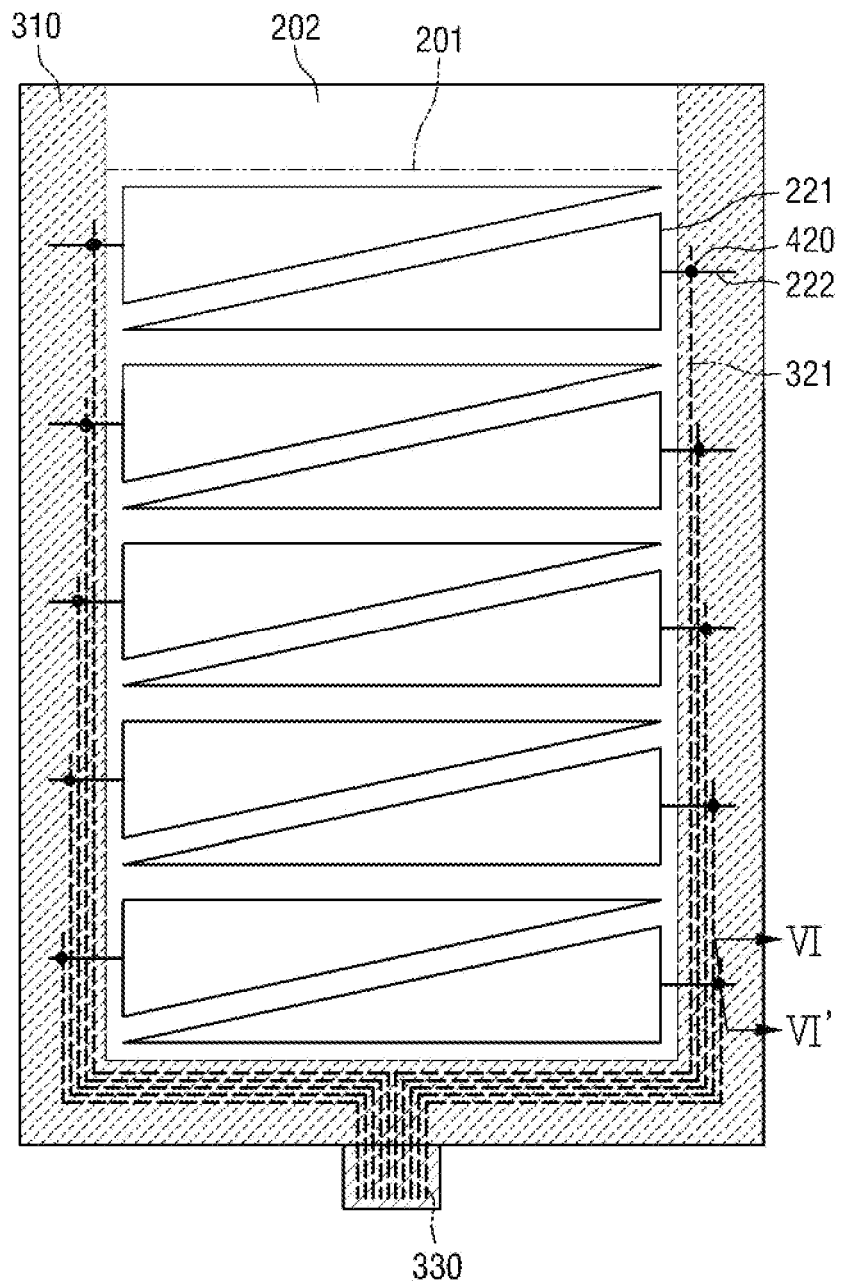
FIG. 3 is a plan view of the touch sensing substrate shown in FIG. 1.
Figure 4:
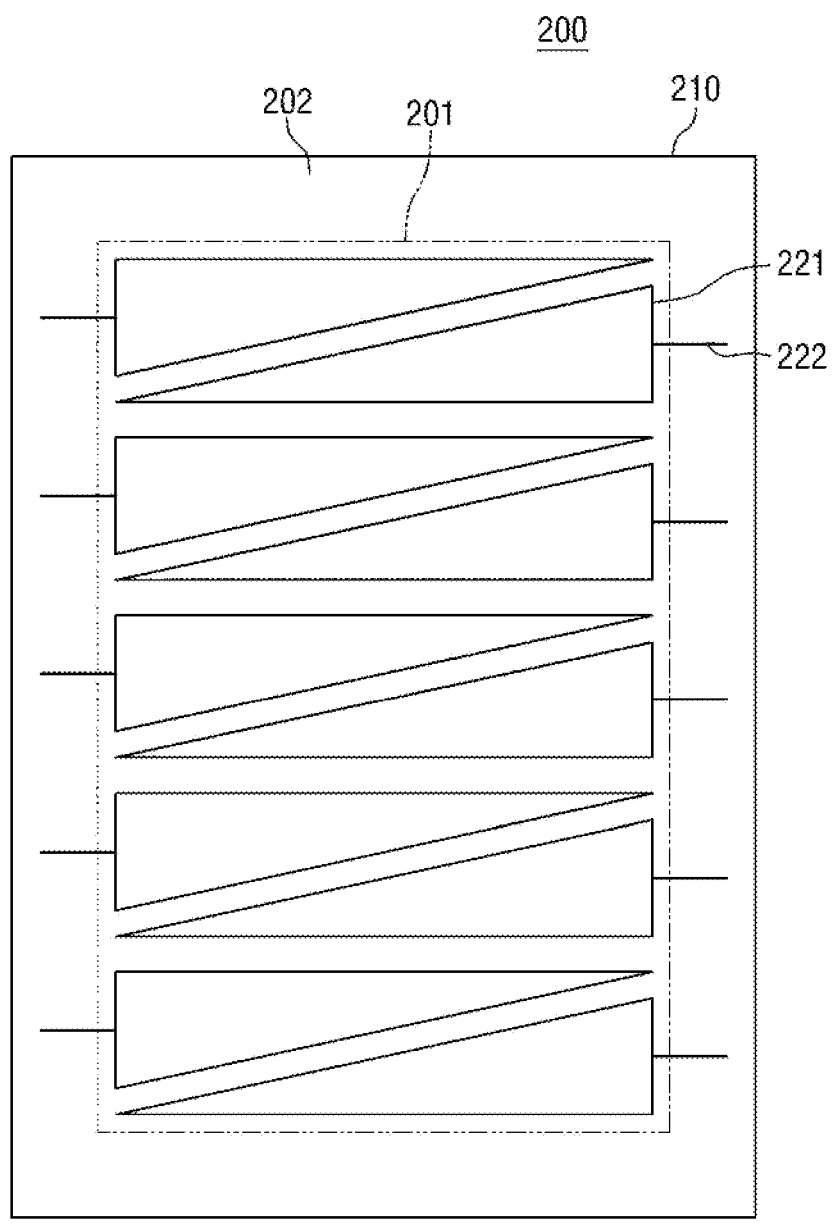
FIG. 4 is a plan view of a first sub-substrate according to an embodiment of the present invention.

FIG. 3 is a plan view of a touch sensing substrate according to an embodiment of the present invention. FIG. 4 is a plan view of a first sub-substrate according to an embodiment of the present invention and FIG. 5 is a plan view of a second sub-substrate according to an embodiment of the present invention.

Figure 5:
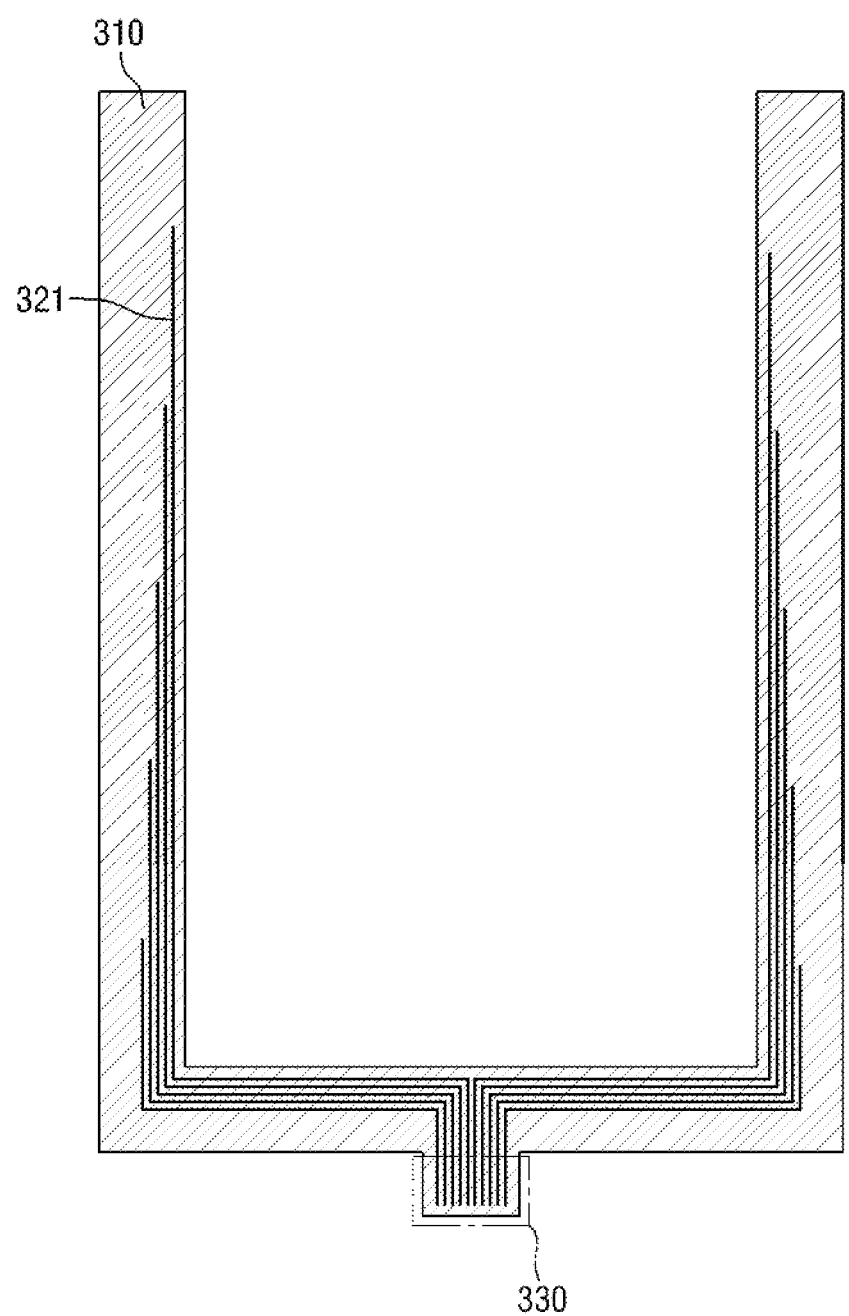
FIG. 5 is a plan view of a second sub-substrate according to an embodiment of the present invention.

Referring to FIGS. 3 to 5, electrode patterns 221 and connection patterns 222 may be formed on a surface of a first sub-substrate 200. The electrode patterns 221 and the connection patterns 222 may be integrally formed by patterning a conductive material formed on the surface of the first base 210. For example, the conductive material of a film type may be formed on the surface of the first base 210. The conductive material may be a transparent material, and examples thereof may include at least one of indium tin oxide (ITO), metal mesh, silver nanowire and carbon nanotube (CNT).

When a touch input is generated, the electrode patterns 221 may generate a touch sensing signal in response to the touch input. The touch sensing signal may indicate a change in the capacitance, with the electrode patterns 221 contacted by a touch object as a conductive plate and an adhesive material applied between the electrode patterns 221 and the touch object or a window as a dielectric material. The change in the capacitance generated due to the touch input may depend on a touch position or touch area on the electrode patterns 221 contacted by the touch object. Therefore, the touch position may be determined based on the change in the capacitance. The first sub-substrate 200 may include a touch sensing region 201 and a peripheral region 202.

According to some embodiments of the present invention, the touch sensing region 201 may be a region where a touch sensing signal is generated when a touch input is applied to the touch sensing region 201. The electrode patterns 221 may generate the touch sensing signal. The electrode patterns 221 may be disposed within the touch sensing region 201. The peripheral region 202 may surround the touch sensing region 201. The peripheral region 202 may be exposed in part or in whole to the outside, depending on the size and location of the bezel 110.

According to some embodiments of the present invention, the touch sensing region 201 may be a region where images displayed on the display panel 500 can be viewed through the touch sensing substrate 400, while the peripheral region 202 may be a region where images cannot be viewed. One ends of the connection patterns 222 are connected to the electrode patterns 221 and the other ends thereof extend toward the peripheral region 202. The connection patterns 222 may transmit the touch sensing signals generated from the electrode patterns 221 to interconnection patterns formed on the second sub-substrate 300.

The second sub-substrate 300 may correspond to the peripheral region 202 of the first sub-substrate 200 in shape. For example, as illustrated in FIG. 5, the second sub-substrate 300 is shaped to correspond to the peripheral region 202 of the first sub-substrate 200 including the left, right and bottom side portions. When the second sub-substrate 300, which is shaped to correspond to the left, right and bottom side portions of the peripheral region 202, is attached to the first sub-substrate 200, a possibility of a contact failure between the first and second sub-substrates 200 and 300 may be reduced, compared to a case where the first sub-substrate 200 and the second sub-substrate 300 are combined to each other through an electrode or pad formed at an end of the first sub-substrate 200.

According to some embodiments of the present invention, when the second sub-substrate 300 is attached to the first sub-substrate 200, the second sub-substrate 300 may be formed such that an overlapping region between the first sub-substrate 200 and the second sub-substrate 300 is included within the peripheral region 202. According to some embodiments of the present invention, the second sub-substrate 300 may be formed and disposed so as not to overlap the touch sensing region 201. In such a case, images displayed on the display panel 500 can be viewed through the touch sensing substrate 400, without being impeded by the second sub-substrate 300. That is to say, an image viewing region can be increased.

Interconnection patterns 321 may be disposed on a surface of the second sub-substrate 300. The interconnection patterns 321 are incorporated into a second conductive pattern 320. When the interconnection patterns 321 are disposed under the first sub-substrate 200 and the second base 310, they may not be seen from the plan view of FIG. 3. For purposes of explanation, a connection relationship between the connection patterns 222 and the interconnection patterns 321 and an arrangement of the interconnection patterns 321 are indicated by dotted lines in FIG. 3. In FIG. 5, which is a plan view illustrating the interconnection patterns 321 disposed on the second base 310, the interconnection patterns 321 are indicated by solid lines. The interconnection patterns 321 may be made of a conductive material, for example, a metal such as copper. The interconnection patterns 321 may be electrically connected to the connection patterns 222. According to some embodiments of the present invention, the interconnection patterns 321 may be connected to the connection patterns 222 through via holes 420. The interconnection patterns 321, which are electrically connected to the connection patterns 222, may receive the touch sensing signals from the connection patterns 222 and transmit the same to the outside of the touch sensing substrate 400 or a touch sensing signal processing chip mounted on the touch sensing substrate 400.

Figure 6:
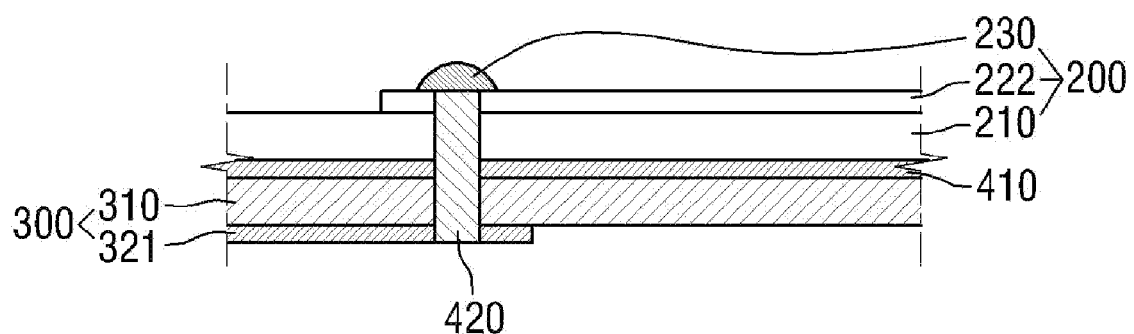
FIG. 6 is a cross-sectional view taken along line VI-VI' of FIG. 3.

FIG. 6 is a cross-sectional view taken along line VI-VI' of FIG. 3. A via hole 420 is formed to penetrate layers disposed between the connection patterns 222 and the interconnection patterns 321. The inside of the via hole 420 may be filled with a conductive material in part or in whole. The via hole 420 is electrically connected to the connection patterns 222 and the interconnection patterns 321 through the conductive material.

The first sub-substrate 300 may further include a capping pattern 230 at a region overlapping with the via hole 420. The capping pattern 230 may be electrically connected to the connection patterns 222. According to some embodiments of the present invention, the capping pattern 230 may be disposed on the connection patterns 222. The capping pattern 230 may be made of a conductive material, such as silver (Ag). If the capping pattern 230 is disposed on the region overlapping with the via hole 420, it may function as a medium facilitating an electrical connection between the conductive material filling the via hole 420 and the connection patterns 222. Although the capping pattern 230 has a semicircular sectional shape in FIG. 6, it would be appreciated that the capping pattern 230 may have various shapes.

According to some embodiments of the present invention, the via hole 420 may overlap the peripheral region 202. In such a case, the via hole 420 is not disposed in an image viewing region and images displayed on the display panel 500 can be viewed through the touch sensing substrate 400. In other words, if the via hole 420 is disposed in the peripheral region 202, the image viewing region can be increased without being impeded by the via hole 420.

Referring back to FIGS. 3 to 5, the interconnection patterns 321 may be disposed at a region overlapping the peripheral region 202. The interconnection patterns 321 are disposed at left and right side portions of the peripheral region 202 and may be electrically connected to the connection patterns 222 through the via holes 420. The interconnection patterns 321 extend downwardly toward a protrusion part 330 through the left and right side portions of the peripheral region 202.

According to some embodiments of the present invention, the interconnection patterns 321 may not be disposed at a region overlapping with the touch sensing region 201. In such a case, the interconnection patterns 321 are not disposed in an image viewing region and images displayed on the display panel 500 can be viewed through the touch sensing substrate 400. In other words, if the interconnection patterns 321 are disposed in the peripheral region 202, the image viewing region can be increased without being impeded by the interconnection patterns 321.

The second sub-substrate 300 may further include the protrusion part 330 that does not overlap the first sub-substrate 200. As illustrated in FIG. 5, the protrusion part 330 may be formed to protrude from the center of the bottom side portion of the second sub-substrate 300. However, it would be appreciated that the protrusion part 330 may be formed at different positions. For example, the protrusion part 330 may be formed to protrude from a different position, not from the center, of the bottom side portion of the second sub-substrate 300. Alternatively, the protrusion part 330 may be formed to protrude from the left or right side portion, not from the bottom side portion, of the second sub-substrate 300.

The interconnection patterns 321 disposed on the left and right side portions of the second sub-substrate 300 may extend from the protrusion part 330 to be assembled with an external circuit. For example, a touch sensing signal processing chip may be mounted on the protrusion part 330 to receive touch sensing signals from the assembled interconnection patterns 321 and process the received touch sensing signals. According to some embodiments of the present invention, terminals or buses connected to an external device may be formed on the protrusion part 330, thereby transmitting the touch sensing signals or information obtained by processing the touch sensing signals to the external device.

Figure 7:
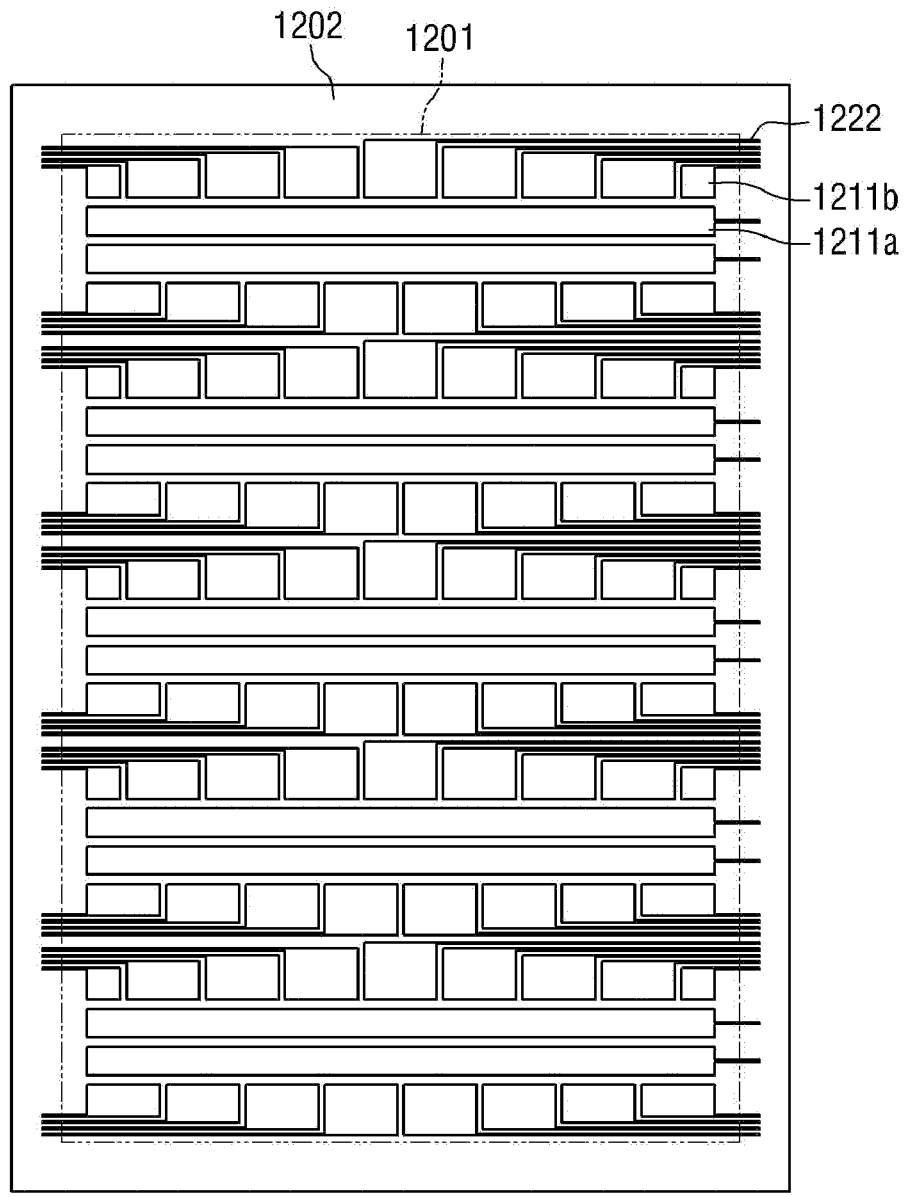
FIG. 7 is a plan view of a first sub-substrate according to another embodiment of the present invention.
Figure 8:
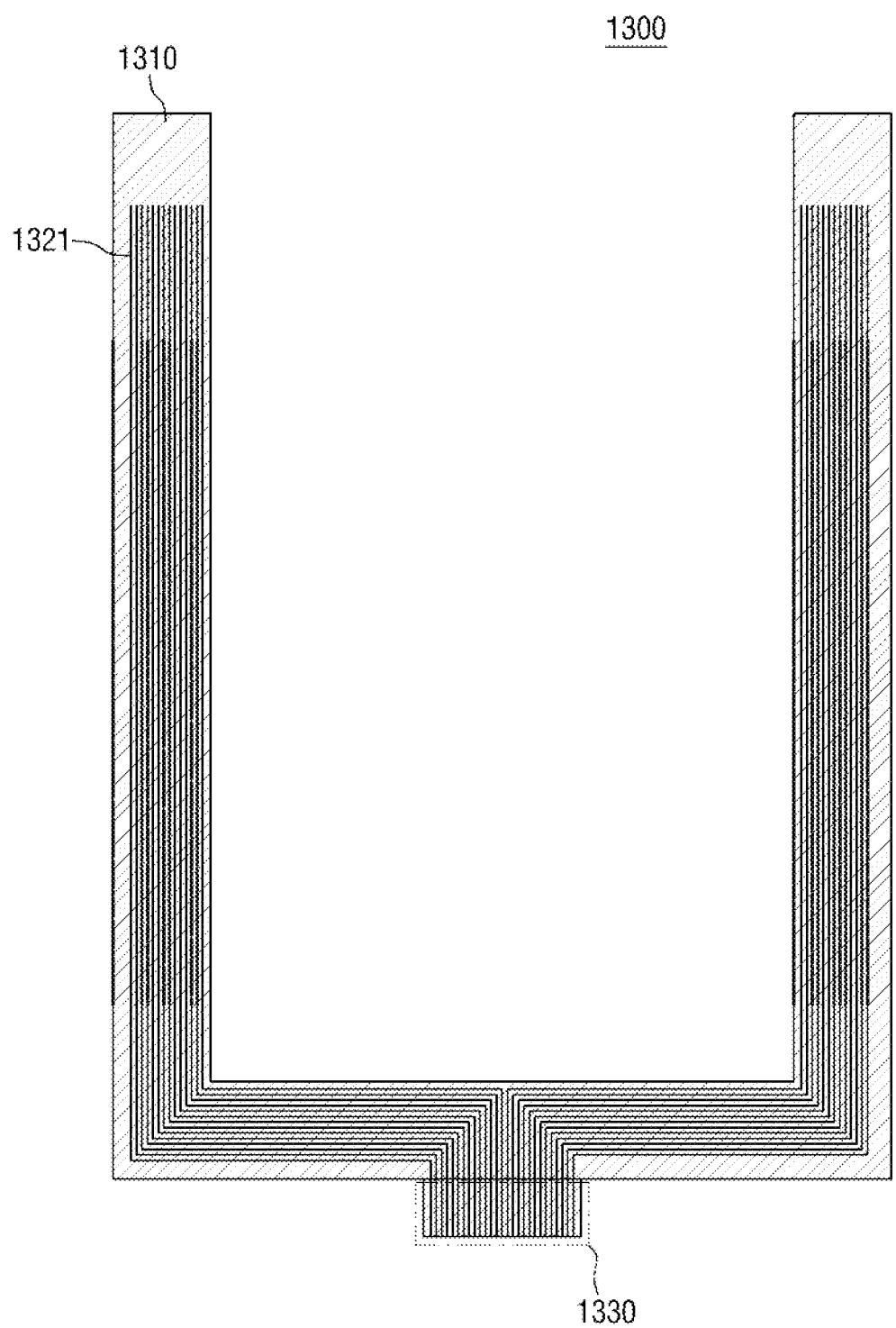
FIG. 8 is a plan view of a second sub-substrate according to another embodiment of the present invention.
Figure 9:
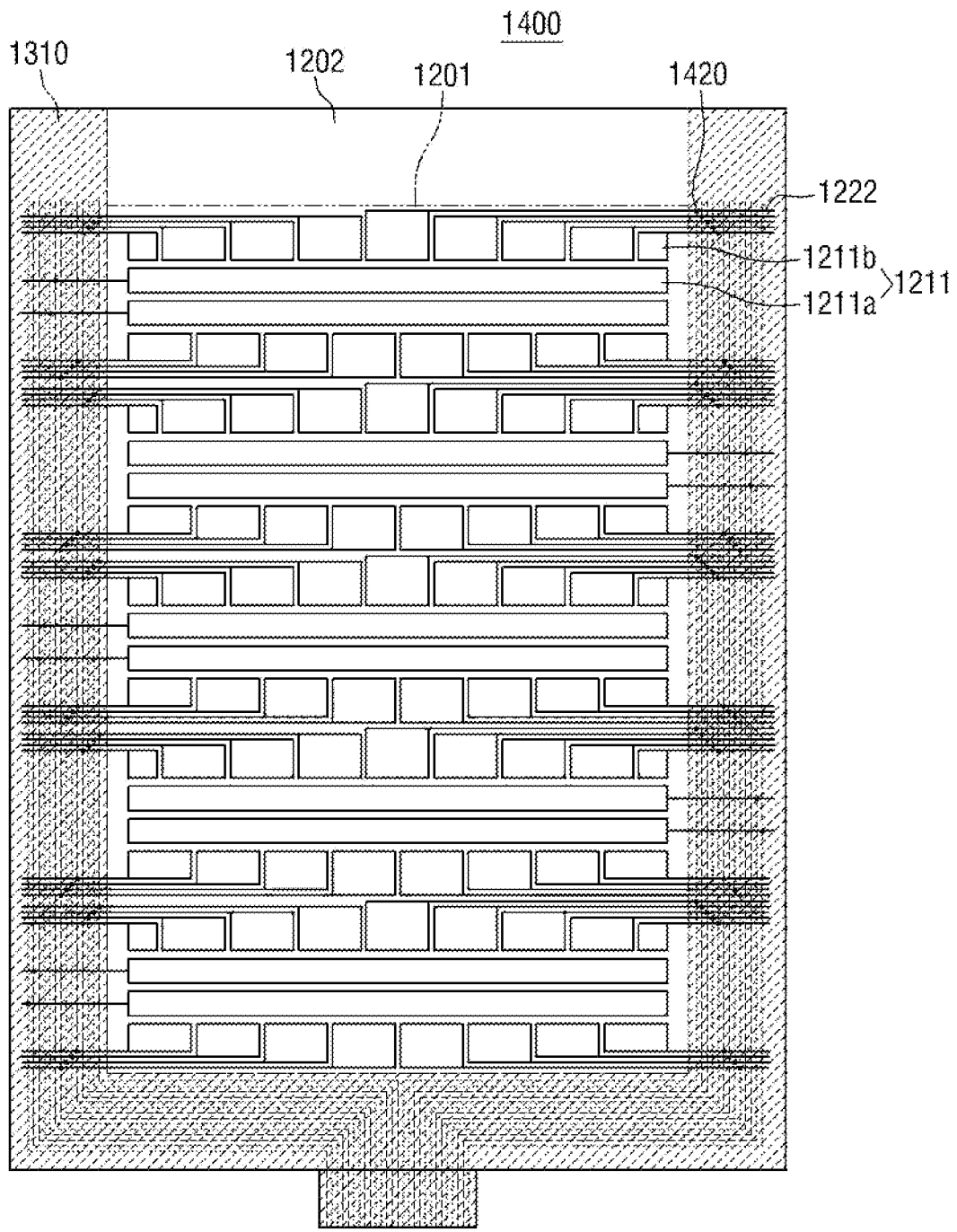
FIG. 9 is a plan view of a touch sensing substrate according to another embodiment of the present invention.

FIG. 7 is a plan view of a first sub-substrate according to another embodiment of the present invention, FIG. 8 is a plan view of a second sub-substrate according to another embodiment of the present invention, and FIG. 9 is a plan view of a touch sensing apparatus according to another embodiment of the present invention.

Referring to FIG. 7, the first sub-substrate 1200 may include a touch sensing region 1201 and a peripheral region 1202. The first sub-substrate 1200 may further include electrode patterns 1211 disposed on a surface of the touch sensing region 1201 of the first sub-substrate 1200. The first sub-substrate 1200 may further include connection patterns 1222 connected to the electrode patterns 1211 and extending to the peripheral region 1202.

The electrode patterns 1211 may include a column electrode 1211a extending in a horizontal direction of the touch sensing region 1201 and a plurality of patch electrodes 1211b divided in the horizontal direction. The touch sensing apparatus using the first sub-substrate illustrated in FIG. 7 may be driven by sequentially applying driving signals to the patch electrodes 1211b and sensing touch sensing signals from the column electrode 1211a. The operation of the touch sensing apparatus having the electrode patterns 1211 illustrated in FIG. 7 is described in Korean Patent Application No. 10-2007-0021332 filed on Mar. 7, 2007 and entitled "Contact position sensing panel having a simplified stacked structure," which is incorporated by reference herein.

FIGS. 4 and 7 illustrate first sub-substrates according to exemplary embodiments of the present invention. However, the first sub-substrate may have various shapes other than those shown in FIGS. 4 and 7. In particular, electrode patterns disposed on the first sub-substrate may be formed in various shapes, and connection patterns and interconnection patterns may vary according to shapes of the electrode patterns.

Referring to FIG. 8, the second sub-substrate 1300 includes a second base 1310 and interconnection patterns 1321. When a touch sensing substrate 1400 is formed, the second sub-substrate 1300 may include a protrusion part 1330 that does not overlap the first sub-substrate 1200. Because the second base 1310, the interconnection patterns 1321 and the protrusion part 1330 are substantially the same as those shown in FIGS. 3 and 5, repeated explanations thereof will be omitted.

FIG. 9 is a plan view of a touch sensing substrate 1400 according to another embodiment of the present invention, which is formed by attaching a first sub-substrate 1200 to a second sub-substrate 1300.

According to some embodiments of the present invention, various wires of interconnection patterns 1321 may be electrically connected to one or more connection patterns 1222 through via holes 1420. The interconnection patterns 1321 and the second sub-substrate 1200 may have various shapes according to the shapes of the electrode patterns 1221 and the connection patterns 1222. For example, the second base 1310 and the interconnection patterns 1321 have a 'U' shape in FIGS. 5 and 8. However, the second base 1310 and the interconnection patterns 1321 may have various shapes, such as a square (□) shape according to shapes of the electrode patterns 1321 and the connection patterns 1322. The components denoted in FIG. 9 are substantially the same components as in FIGS. 3 to 5, and repeated descriptions thereof will be thus omitted.

FIGS. 10 to 19 are schematic view illustrating a method for manufacturing a touch sensing substrate and a touch sensing apparatus according to embodiments of the present invention.

Figure 10:
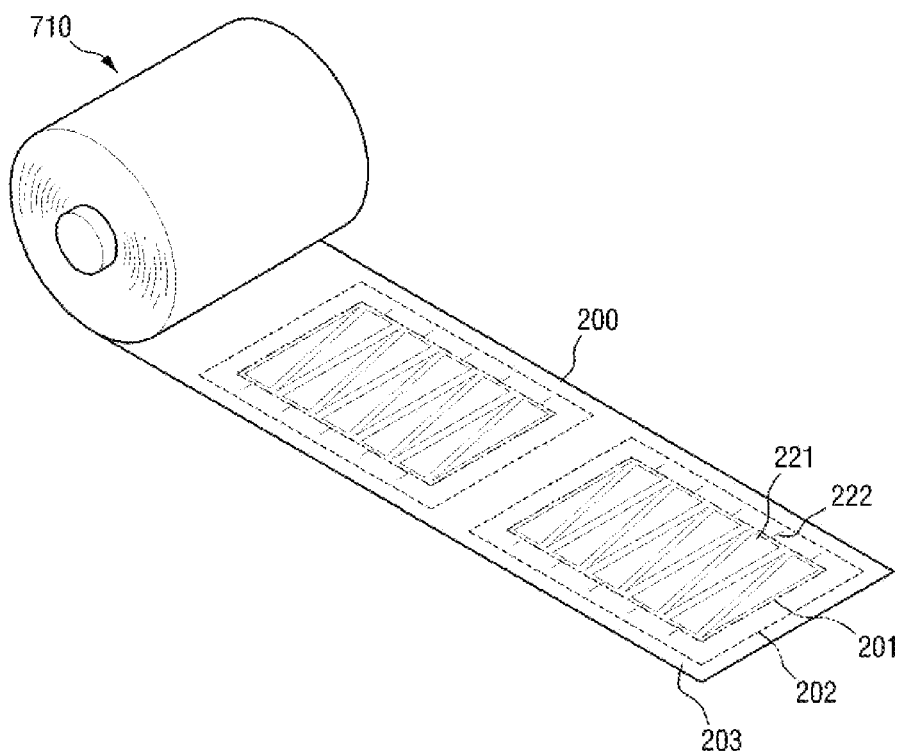
FIGS. 10 to 19 are schematic views illustrating a method for manufacturing a touch sensing substrate and a touch sensing apparatus according to embodiments of the present invention.

Referring to FIG. 10, a method for manufacturing a touch sensing substrate according to the present invention may include repeatedly and continuously forming a plurality of electrode patterns 221 and a plurality of connection patterns 222 on a first sub-substrate 200 unwound from a first roller 710. The first sub-substrate 200 is formed in a roll type to be unwound from the first roller 710. The first sub-substrate 200 may include a first base 210 and a transparent conductive layer formed on a surface of the first base 210. According to some embodiments of the present invention, the transparent conductive layer may be formed in a film type and coated on the surface of the first base 210. The transparent conductive layer may include, for example, tin oxide (ITO), metal mesh, silver nanowire, carbon nanotube (CNT), or the like. The electrode patterns 221 may be formed by patterning and etching the transparent conductive layer. According to some embodiments of the present invention, the electrode patterns 221 may be repeatedly formed while moving the first sub-substrate 200 in one direction as the first sub-substrate 200 is unwound. The connection patterns 222 may be formed by patterning the transparent conductive layer at the same time when the electrode patterns 221 are formed. The electrode patterns 221 and the connection patterns 222 may be integrally formed.

The first sub-substrate 200 may include a touch sensing region 201, a peripheral region 202 surrounding the touch sensing region 201 and a dummy region 203 surrounding the peripheral region 202. The touch sensing region 201 and the peripheral region 202 may be repeatedly defined in a direction in which the first sub-substrate 200 unwound from the first roller 710 travels. Because the first sub-substrate 200 includes the dummy region 203, it may protect the touch sensing region 201 and the peripheral region 202 against external impacts during the manufacturing process. However, the dummy region 203 may be removed when forming the touch sensing apparatus.

The electrode patterns 221 may be formed within the touch sensing region 201. The connection patterns 222 may be connected to the electrode patterns 221 and extend to the peripheral region 202. The electrode patterns 221 and the connection patterns 201 are substantially the same as those shown in FIGS. 3 and 4, repeated explanations thereof will be omitted.

Figure 11:
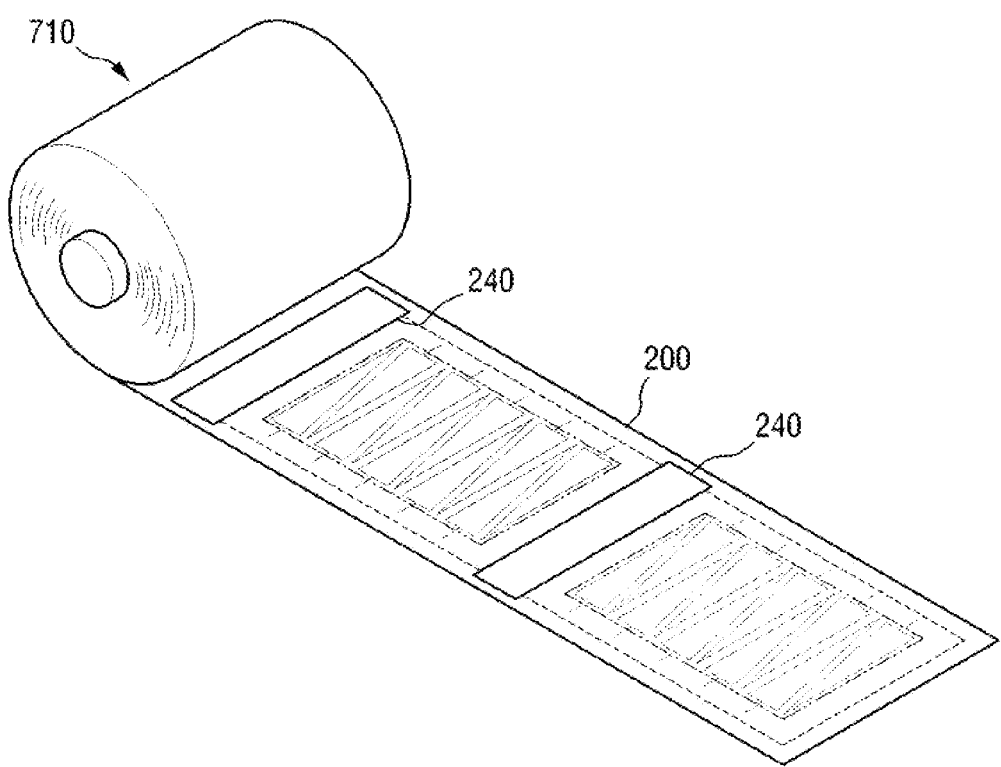

Referring to FIG. 11, the method for manufacturing a touch sensing substrate may include forming a first cutting part 240 on the first sub-substrate 200. The first cutting part 240 may be formed by cutting a portion of the first sub-substrate 200. The first cutting part 240 may be repeatedly formed in a direction in which the first sub-substrate 200 unwound from the first roller 710 travels. The first cutting part 240 may be formed at a region between the repeatedly formed plurality of electrode patterns 221.

According to some embodiments of the present invention, the first cutting part 240 may be formed at a region between a plurality of peripheral regions 202. In more detail, the first cutting part 240 may be formed to be interlinked with one side of the peripheral region 202. Since the first cutting part 240 is formed to be interlinked with one side of the peripheral region 202, the first cutting part 240 may define the outer part of one side of the first sub-substrate 200 included in the touch sensing apparatus. The first cutting part 240 may be formed to be interlinked with each side of the peripheral region 202 disposed at opposite sides of the first cutting part 240. If the first cutting part 240 is formed to be interlinked with each side of the peripheral region 202 disposed at opposite sides of the first cutting part 240, the first cutting part 240 may define the outer parts of opposite sides of the touch sensing substrate.

Figure 12:
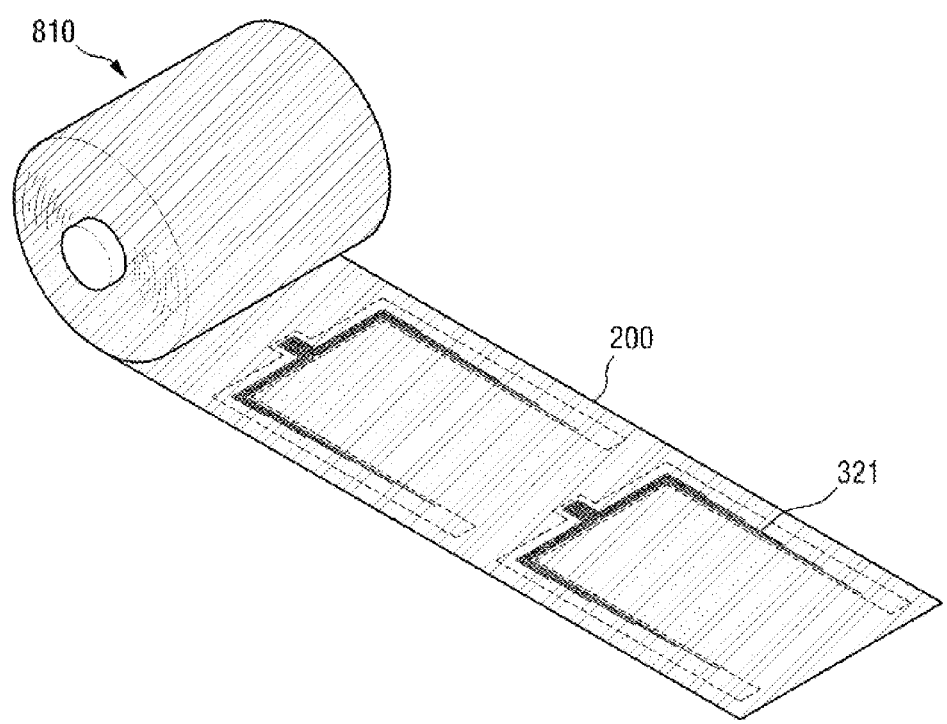

Referring to FIG. 12, the method for manufacturing a touch sensing substrate may include repeatedly forming interconnection patterns 321 on a second sub-substrate 300 unwound by the second roller 810. The second sub-substrate 300 is formed in a roll type to be unwound from the second roller 810. The interconnection patterns 321 may be formed by printing a conductive material on a surface of the second sub-substrate 300. The conductive material printed on the second sub-substrate 300 may include metal, such as copper. The interconnection patterns 321 may be repeatedly formed while moving the second sub-substrate 300 in one direction as the second sub-substrate 300 is unwound. According to some embodiments of the present invention, the interconnection pattern 321 may include opposite side portions extending in one direction to be parallel to each other, a connection part extending from the opposite side portions and having wires concentrated thereon, and a protrusion part in which the concentrated wires extend and protrude.

Figure 13:
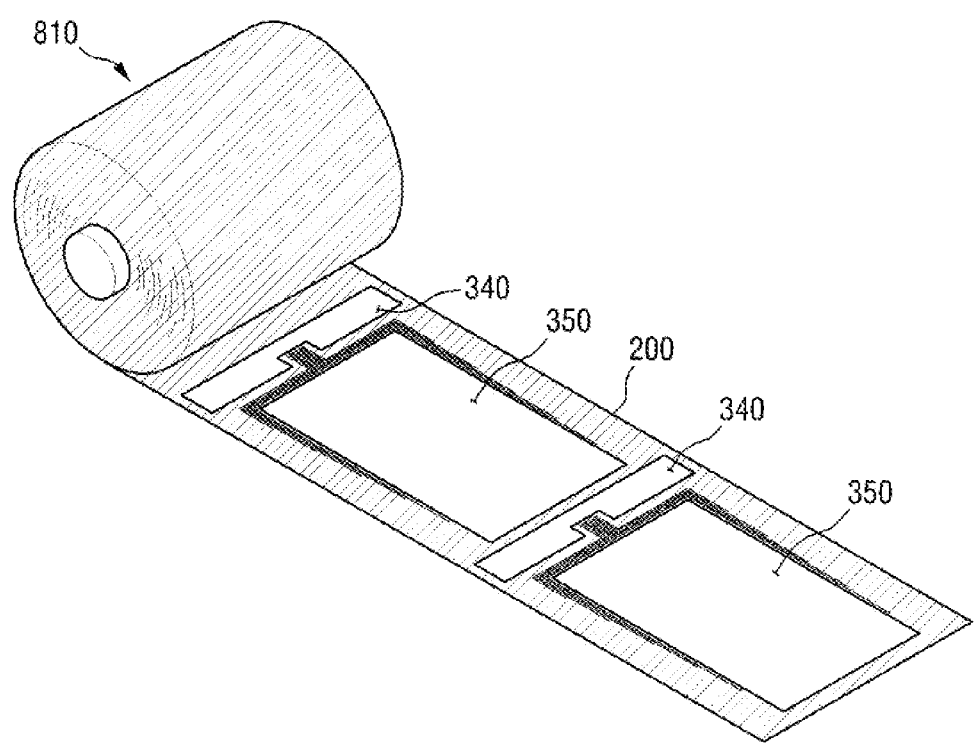

Referring to FIG. 13, the method for manufacturing a touch sensing substrate may include forming a second cutting part 340 and a third cutting part 350 on the second sub-substrate 300. The second cutting part 340 may be formed at a region between the repeatedly formed interconnection patterns 321. According to some embodiments of the present invention, the second cutting part 340 may form one-side outer part of the second sub-substrate 300 in each touch sensing substrate. The third cutting part 350 may be disposed at a region between opposite side portions of the interconnection patterns 321. According to some embodiments of the present invention, when the first sub-substrate 200 is attached to the second sub-substrate 300, the touch sensing region 201 may be formed to overlap the third cutting part 350 to be positioned within the third cutting part 350. According to some embodiments of the present invention, when the first sub-substrate 200 is attached to the second sub-substrate 300, the electrode patterns 221 may be formed to overlap the third cutting part 350 to be positioned within the third cutting part 350. According to some embodiments of the present invention, the third cutting part 350 may be formed to overlap a region of a parallelogram having the opposite side portions as its two sides of the interconnection pattern 321.

Figure 14:
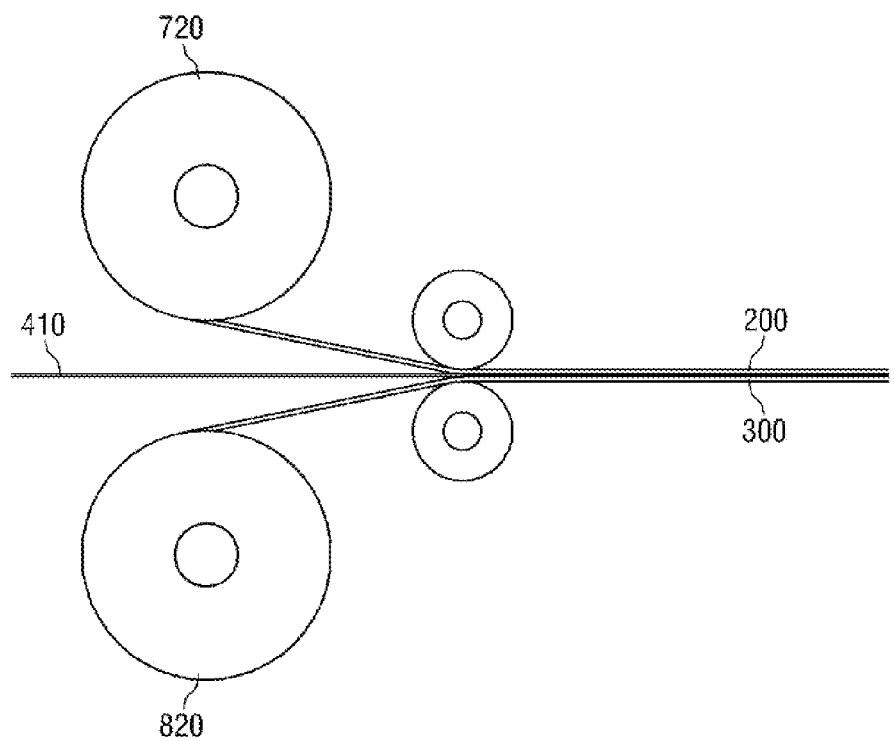

Referring to FIG. 14, the method for manufacturing a touch sensing substrate may include forming a touch sensing substrate by attaching the first sub-substrate 200 to the second sub-substrate 300. According to some embodiments of the present invention, the first sub-substrate 200 may be wound around a third roller 720 after forming the electrode patterns 221, the connection patterns 222 and the first cutting part 240. The first sub-substrate 200 wound around the third roller 720 is then unwound from the third roller 720 and may be attached to the second sub-substrate 300. According to some embodiments of the present invention, the second sub-substrate 300 may be unwound from a fourth roller 820 after forming the interconnection patterns 321. The second sub-substrate 300 wound around the fourth roller 820 is then unwound from the fourth roller 820 and may be attached to the first sub-substrate 200.

According to some embodiments of the present invention, the first sub-substrate 200 and the second sub-substrate 300 are attached to each other such that the opposite surface to the surface of the first sub-substrate 200 having the electrode patterns 221 formed thereon and the opposite surface to the surface of the second sub-substrate 300 having the interconnection patterns 321 formed thereon face each other. According to some embodiments of the present invention, the first sub-substrate 200 and the second sub-substrate 300 may be attached to each other using an adhesive layer 410. The adhesive layer 410 may include a variety of types of adhesives such as an adper prompt (AP) adhesive, an acryl adhesive or a film type adhesive.

Although the first sub-substrate 200 and the second sub-substrate 300 are attached to each other using a double-sided adhesive in FIG. 14, it would be appreciated that the attaching may vary according to the type of adhesive used. For example, when a liquid type adhesive is used, the adhesive is first coated on the second sub-substrate 300, and the first sub-substrate 200 and the second sub-substrate 300 are then attached to each other. The adhesive forms the adhesive layer 410 to then be disposed between the first sub-substrate 200 and the second sub-substrate 300. According to some embodiments of the present invention, the adhesive layer 410 may be disposed at an overlapping region between the first sub-substrate 200 and the second sub-substrate 300. If the second sub-substrate 300 does not overlap the touch sensing region 201 of the first sub-substrate 200, images can be viewed through the touch sensing substrate, without being impeded by the adhesive layer 410.

Figure 15:
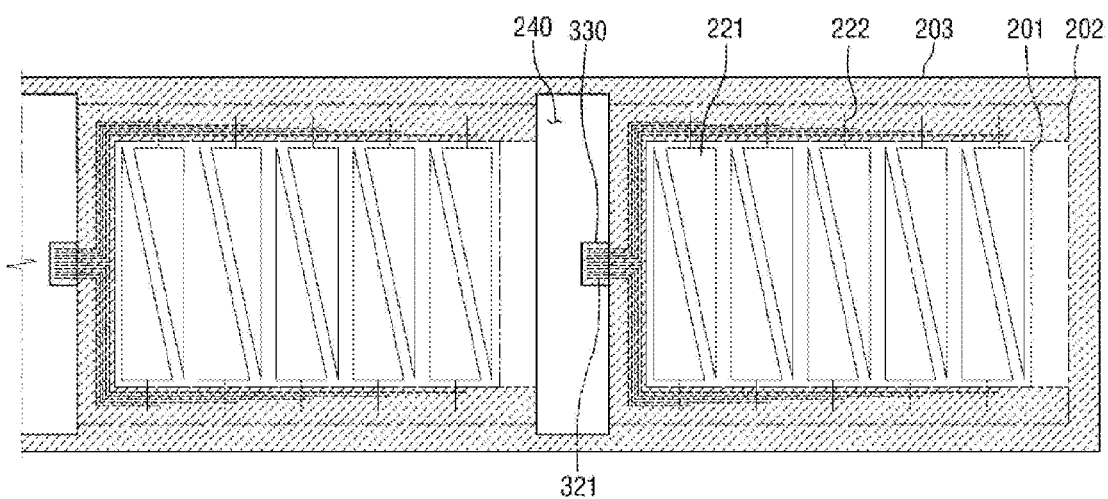

FIG. 15 is a plan view illustrating a touch sensing substrate. The touch sensing substrate will now be described in detail.

Referring to FIG. 15, the touch sensing substrate may be configured such that the interconnection patterns 321 and the touch sensing region 201 do not overlap each other. According to some embodiments of the present invention, the opposite side portions and connecting part of the interconnection pattern 321 may be positioned within the peripheral region 202. The second sub-substrate 300 may include a protrusion part 330 that does not overlap the first sub-substrate 200. Because the protrusion part 330 illustrated in FIG. 15 is substantially the same as that shown in FIG. 3 or 5, a repeated description thereof will be omitted.

Figure 16:
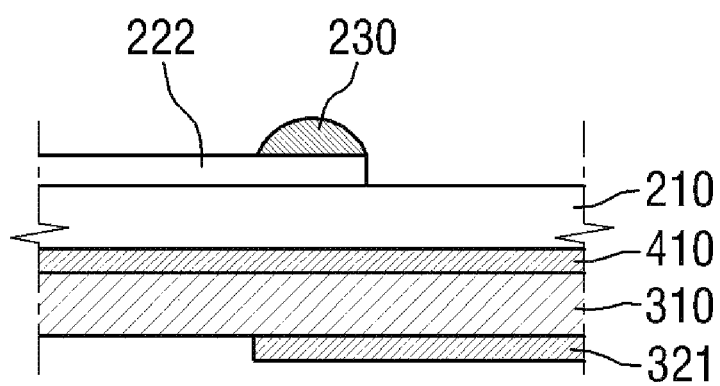
Figure 17:
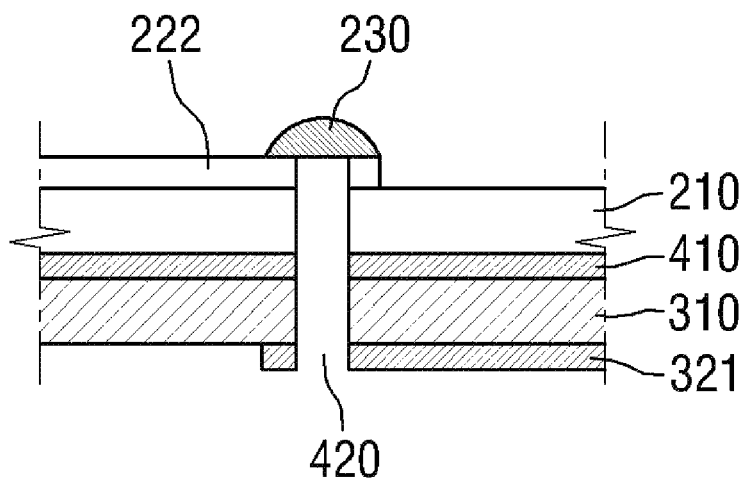
Figure 18:
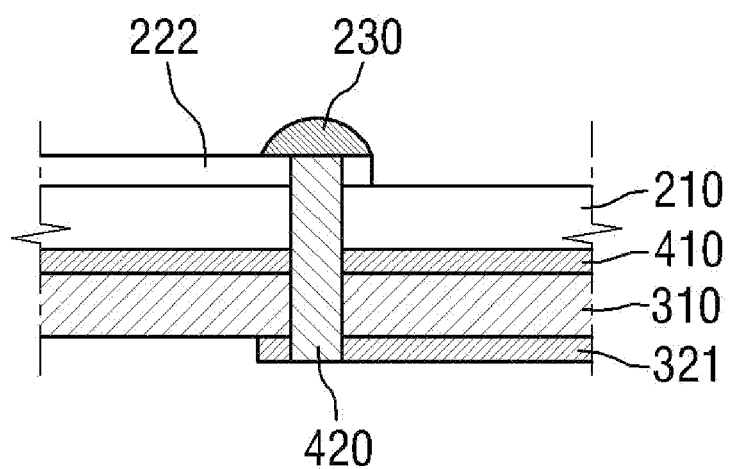

The method for manufacturing a touch sensing substrate may include connecting a plurality of connection patterns to a plurality of respective interconnection patterns by forming via holes in the touch sensing substrate. FIGS. 16 to 18 are cross-sectional views illustrating a via hole formed in the touch sensing substrate.

Referring to FIG. 16, a capping pattern 230 may be formed in the touch sensing substrate. The capping pattern 230 may be made of silver (Ag), other metal or conductive materials. The capping pattern 230 may be electrically connected to the connection patterns 222. According to some embodiments of the present invention, the capping pattern 230 may be formed in portions of the connection patterns 222 to be in contact with the connection patterns 222. The capping pattern 230 may be formed at an overlapping region between the connection patterns 222 and the interconnection patterns 321. According to some embodiments of the present invention, the capping pattern 230 may be disposed in the peripheral region 202. In some other embodiments of the present invention, the capping pattern 230 may not be disposed in the touch sensing region 201. When the capping pattern 230 made of a reflective material is disposed in the touch sensing region 201, it may prevent images that are externally viewed through the touch sensing substrate from being viewed, or images may be distorted.

Referring to FIG. 17, a via hole 420 may be formed in the touch sensing substrate. The via hole 420 may be formed to overlap the capping pattern 230. For example, the via hole 420 may be formed to overlap all of the capping pattern 230, the connection patterns 222 and the interconnection patterns 321. According to some embodiments of the present invention, the via hole 420 may be formed to penetrate the capping pattern 230, the connection patterns 222, a first base 210 disposed between the capping pattern 230 and the connection patterns 222, a second base 220 and an adhesive layer 410.

Referring to FIG. 18, the via hole 420 formed in the touch sensing substrate may be filled with a conductive material. The conductive material may include a metal such as copper, zinc or lead, or other non-metallic conductive materials. Because the via hole 420 is filled with a conductive material, the connection patterns 222 and the interconnection patterns 321 may be electrically connected to each other through the via holes 420.

The method for manufacturing a touch sensing substrate according to the present invention may include cutting the array of touch sensing substrates into individual touch sensing substrates. The array of touch sensing substrates may be cut such that each touch sensing substrate 400 includes its electrode patterns 221 and interconnection patterns 321. According to some embodiments of the present invention, the array of touch sensing substrates may be cut along the boundary between a dummy region 203 and a peripheral region 202 into individual touch sensing substrates 400. If the array of touch sensing substrates is cut into touch sensing substrates, a unit of the touch sensing substrate 400 shown in FIG. 3 can be obtained from the array of touch sensing substrates. Because the touch sensing substrate 400 is substantially the same as that shown in FIGS. 3 to 5, a repeated description thereof will be omitted.

Figure 19:
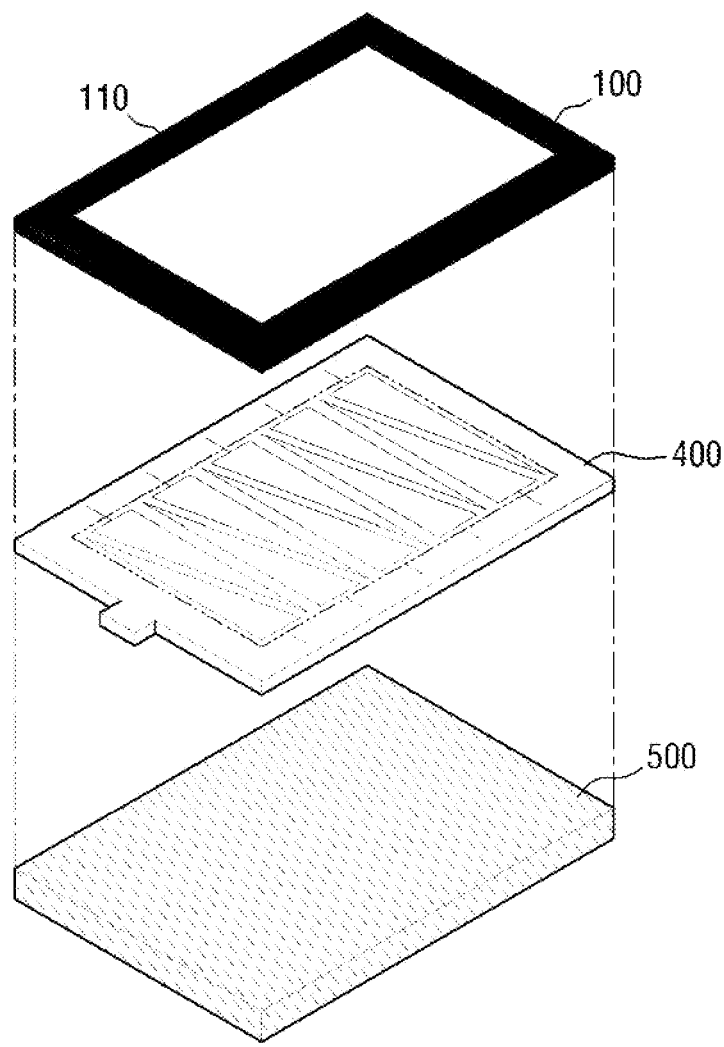

Referring to FIG. 19, a method for manufacturing a touch sensing apparatus according to the present invention may include combining a transparent window 100 and a display panel 500 to the touch sensing substrate 400. According to some embodiments of the present invention, the transparent window 100 may be disposed on the surface of the touch sensing substrate 400 having the electrode patterns 221 disposed thereon. The touch sensing substrate 400 and the transparent window 100 may be attached to each other using an adhesive disposed therebetween. The adhesive may be, for example, an optically clear adhesive (OCA). According to some embodiments of the present invention, the display panel 500 may be disposed on the surface of the touch sensing substrate 400 having the interconnection patterns 331 disposed thereon. According to some embodiments of the present invention, the touch sensing substrate 400 and the display panel 500 may be attached to each other using an adhesive disposed therebetween. Alternatively, the touch sensing substrate 400 and the display panel 500 may be attached to each other in a mechanical manner. The touch sensing apparatus including the display panel 500 may function not only as a touch sensing apparatus but also as a display apparatus.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for manufacturing a touch sensing apparatus, the method comprising:
   repeatedly forming a plurality of electrode patterns on a first sub-substrate unwound from a first roller;
   repeatedly forming a plurality of interconnection patterns on a second sub-substrate unwound by a second roller;
   forming an array of touch sensing substrates by adhering the first sub-substrate to the second sub-substrate;
   forming a plurality of via holes through which the plurality of electrode patterns are electrically connected to the plurality of interconnection patterns; and
   cutting the array of touch sensing substrates into a plurality of touch sensing substrates, each touch sensing substrate including one of the electrode patterns and one of the interconnection patterns.

2. The method of claim 1, further comprising forming a plurality of connection patterns electrically connected to the plurality of electrode patterns on the first sub-substrate,
   wherein the first sub-substrate includes a touch sensing region and a peripheral region
   surrounding the touch sensing region, the electrode patterns are disposed in the touch sensing region, a portion of the connection patterns extending into the peripheral region, and the interconnection patterns and the connection patterns are electrically connected to each other through the via holes.

3. The method of claim 2, wherein the forming of the via holes comprises forming the via holes to overlap the peripheral region.

4. The method of claim 2, further comprising forming a capping pattern electrically connected to the connection patterns,
wherein the capping pattern overlaps the via hole.

5. The method of claim 2, further comprising:
forming a first cutting part at a region between each of the plurality of electrode patterns of the first sub-substrate; and
forming a second cutting part at a region between each of the plurality of interconnection patterns of the second sub-substrate,
wherein the forming of the array of touch sensing substrates comprises allowing the first cutting part and the second cutting part to overlap each other.

6. The method of claim 5, wherein a portion of the interconnection patterns overlap the first cutting part.

7. The method of claim 2, wherein the plurality of electrode patterns and the plurality of connection patterns are integrally formed at the same time with a transparent conductive material.

8. The method of claim 7, wherein the transparent conductive material includes at least one of indium tin oxide (ITO), metal mesh, silver nanowire and carbon nanotube (CNT).

9. The method of claim 2, further comprising forming a third cutting part on the second sub-substrate, wherein the touch sensing region completely overlaps the third cutting part to be positioned within the third cutting part, and the interconnection patterns completely overlap the peripheral region to be positioned within the peripheral region.

10. The method of claim 9, wherein the interconnection patterns are formed on the second sub-substrate with a 'U' shape.

11. The method of claim 2, wherein the first sub-substrate further includes a dummy region surrounding the peripheral region, and the array of touch sensing substrates is cut along a boundary between the peripheral regions.

12. The method of claim 1, wherein the first sub-substrate is transparent.

13. The method of claim 1, wherein the forming of the array of touch sensing substrates comprises attaching the first sub-substrate and the second sub-substrate using an adper prompt (AP) adhesive or an acryl adhesive.

14. The method of claim 1, wherein the electrode patterns are formed on one surface of the first sub-substrate, the interconnection patterns are formed on one surface of the second sub-substrate, and the forming of the array of touch sensing substrates comprises attaching the first sub-substrate and the second sub-substrate to each other such that an opposite surface to the one surface of the first sub-substrate having the electrode patterns and an opposite surface to the one surface of the second sub-substrate having the interconnection patterns face each other.

15. The method of claim 2, further comprising:
disposing a transparent window on the first sub-substrate of the cut touch sensing substrate; and
attaching the first sub-substrate and the transparent window using an optically clear adhesive (OCA).

* * * * *